United States Patent [19]

Favre

[11] Patent Number: 5,707,698
[45] Date of Patent: Jan. 13, 1998

[54] SYNTHETIC RESIN ARTICLE IN TWO PARTS AND PROCESS FOR ITS PRODUCTION

[75] Inventor: Bernard Favre, Sceaux, France

[73] Assignee: LIR France, Chevilly-Larue, France

[21] Appl. No.: 510,061

[22] Filed: Aug. 1, 1995

[30] Foreign Application Priority Data

Aug. 1, 1994 [FR] France .................. 94 09533

[51] Int. Cl.$^6$ .................. B65D 1/40; B32B 3/04
[52] U.S. Cl. .................. 428/35.7; 428/36.9; 428/36.91; 428/122; 428/124; 428/130; 428/195; 428/206; 428/207; 220/648; 220/737; 220/739
[58] Field of Search .................. 220/8, 648, 737, 220/738, 739; 428/35.7, 36.9, 36.91, 122, 124, 130, 195, 206, 207

[56] References Cited

U.S. PATENT DOCUMENTS

| | | | |
|---|---|---|---|
| 2,076,550 | 4/1937 | Conner | 215/12 |
| 4,047,633 | 9/1977 | Trombly | 220/9 R |
| 4,163,374 | 8/1979 | Moore et al. | 220/737 |
| 4,495,125 | 1/1985 | Hatakeyama et al. | 264/132 |
| 4,789,073 | 12/1988 | Fine | 220/140 |
| 5,036,998 | 8/1991 | Dunn | 220/469 |
| 5,153,042 | 10/1992 | Indrelie | 428/41.1 |
| 5,467,891 | 11/1995 | Perry | 220/739 |
| 5,551,592 | 9/1996 | Barton et al. | 220/739 |

FOREIGN PATENT DOCUMENTS

| | | |
|---|---|---|
| 1242602 | 8/1960 | France . |
| 1480404 | 4/1967 | France . |
| 2 526 757 | 11/1983 | France . |
| 3612694 | 10/1987 | Germany . |

OTHER PUBLICATIONS

Webster's Dictionary, Riverside Publishing, p.740, 1994.

*Primary Examiner*—Rena Dye
*Attorney, Agent, or Firm*—Young & Thompson

[57] ABSTRACT

A synthetic resin article includes a translucent or semitranslucent external portion (10) and an internal portion (1) having on its external surface an ornament, in particular a gold or silver metallization. The external and internal portions (10 and 1) comprise complementary assembly structure (8, 14; 5, 11) and are assembled by wedging and ultrasonic welding. The internal portion (1) is formed of a thermoplastic resin selected from the group consisting of polyolefin, polyamide, PVC, polyethylene terephthalate and methylpentene resins. The external portion (10) is constituted of a translucent or semitranslucent synthetic resin. The internal portion (1) is a tubular element comprising a bottom (2) of larger transverse cross section than a tubular portion (3) of the internal portion (1) and which has a bent-back edge (4) extending along the tubular portion (3) of the tubular element creating a recess (5). The tubular element has at its open end opposite this bottom (2) a projection (8) on its external surface and the external portion (10) is a tubular element of dimensions corresponding to those of the internal portion (1), of which one of the ends has a projection (11) from its internal surface disposed in the recess (5) of the internal portion (1) and whose other end has an edge (15) bent back toward the interior of the tubular element creating a recess (14) in which is disposed the projection (8) of the internal portion (1).

6 Claims, 2 Drawing Sheets

SYNTHETIC RESIN ARTICLE IN TWO PARTS AND PROCESS FOR ITS PRODUCTION

FIELD OF THE INVENTION

The invention relates to a synthetic resin article that can be used particularly for packaging cosmetic products, perfumes and the like and its process for production.

BACKGROUND OF THE INVENTION

Synthetic resin articles can have ornaments and decorations at their external surface, particularly in the form of brilliant gold or silver metallic decorations.

Conventional methods are known to create this type of ornamentation and consist in applying an electrolytic deposit on a premolded article or to galvanize it or again to use a thermal transfer of film. Apart from the fact that these methods rapidly give rise to problems of use if the articles in question have complicated shapes, it is also necessary to apply a protective layer to the shaped ornament, which particularly increases the cost of the process of production.

Other methods are known and provide for a manufacturing process of a synthetic resin article having an ornament independent of the shape of said article.

Thus, according to FR-A-2 526 757, for the production of a vial for example, a relatively thin tubular element of molded material is shaped and has at its external surface any desired ornament. This member is then inserted in a translucent external member and its internal diameter is such that the calculated developed perimeter closely matches the internal perimeter of the external member. The assembly is then over-molded internally with a synthetic resin thanks to a mold core so as to have assembly and retention elements for the vial thus produced. However, despite these advantages, this process requires extensive handling and costly tooling and, as a result, has a high cost which represents a considerable drawback during mass production of this type of article.

U.S. Pat. No. 4,047,633 provides simply inserting an ornamental image within the space created for this purpose between the walls of the two interfitted containers, the edges of the containers being then permanently assembled. However, such a device is not satisfactory when the ornamental image must be borne by a plastic sheet received in the space between the walls, which increases the cost of production while this same space can in the case of incorrect assembly of the walls give rise to the soiling of the ornament and permitting the influx of air or product.

SUMMARY OF THE INVENTION

The invention therefore has for its object to improve this type of production by providing a synthetic resin article and a process for its manufacture, permitting simple production at a much lower cost.

The invention consists in a synthetic resin article comprising a transparent or semitransparent external portion and an internal portion comprising on its external surface an ornament, characterized in that said external and internal portions comprise complementary assembly means and are assembled by wedging and ultrasonic welding.

The invention also consists in a process for the production of such a synthetic resin article, characterized in that there is molded, according to the shape of the desired article, an external portion of said article, transparent or semitransparent, comprising assembly means, there is then molded an internal portion of corresponding shape, comprising assembly means corresponding to said assembly means of the external portion and there is applied an ornament or decoration on the external surface of the internal portion, then the internal and external portions are assembled by wedging of the article with the aid of assembly means and welding by ultra-sound said two internal and external portions.

Preferably, the external wall of the internal portion remains along the internal wall of the external portion without any space between them.

The shape of the synthetic resin article can preferably be of circular, square, rectangular, oval or any other cross section desired for said article.

The molding is effected so as to give to the external and internal portions a shape determined as a function of the desired article and such that said portions have assembly means permitting their assembly with each other, particularly by wedging.

Thus, the external transparent portion is a member formed by molding for example from a transparent or semitransparent synthetic resin. Preferably, the mold and the external portion can also be designed to give to said portion an external surface having supplemental decorative elements such as grooves, hollows, bosses, etc.

Preferably, the internal portion can be formed from a thermoplastic resin selected from the group consisting of polyolefin, polyamide, PVC, polyethylene terephthalate and methylpentene resins.

Before assembly of the two portions, said internal portion is provided with the desired ornamentation. Thus, it can be metallized on its external surface. The ornament or decoration can also be emplaced by the use of a thermal transfer film or by printing.

The internal and external portions are assembled so that the decorated surface of the internal portion can be seen behind the transparent external portion. Welding is then effected ultrasonically and permits a securement of the portions together.

Thus, when the two internal and external portions are assembled with each other, the decoration or ornament will be visible but it is preferably protected by the external portion and therefore not subject to deterioration by preventing the vapors of the enclosed product and/or the product itself from penetrating and being trapped between the two portions of the article in the possibly metallized region, thereby avoiding attack on the decoration or alteration of the appearance visible by transparency.

BRIEF DESCRIPTION OF THE DRAWINGS

The invention will be better understood from a reading of the following description of an embodiment of a synthetic resin article, with reference to the accompanying drawings, in which.

DETAILED DESCRIPTION OF THE INVENTION

Figure 1:
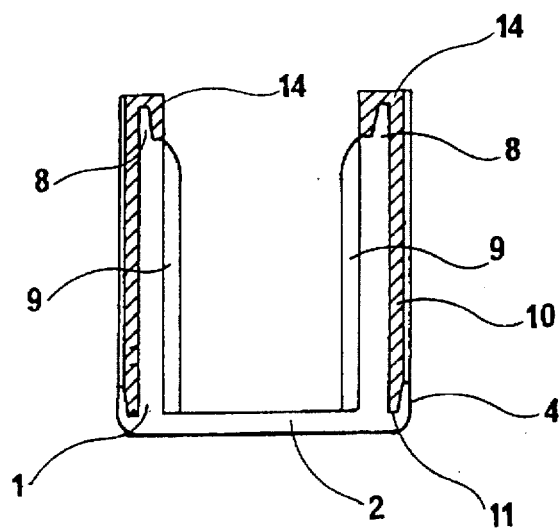
FIG. 1 is a cross-sectional view of the article according to an embodiment of the invention.
Figure 2:
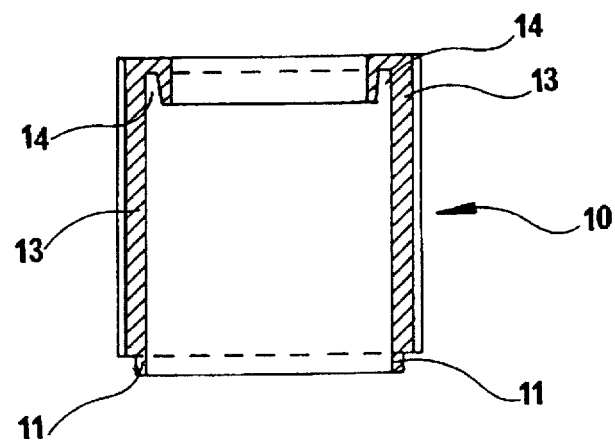
FIG. 2 is a cross-sectional view of the external portion of the article according to FIG. 1.
Figure 3:
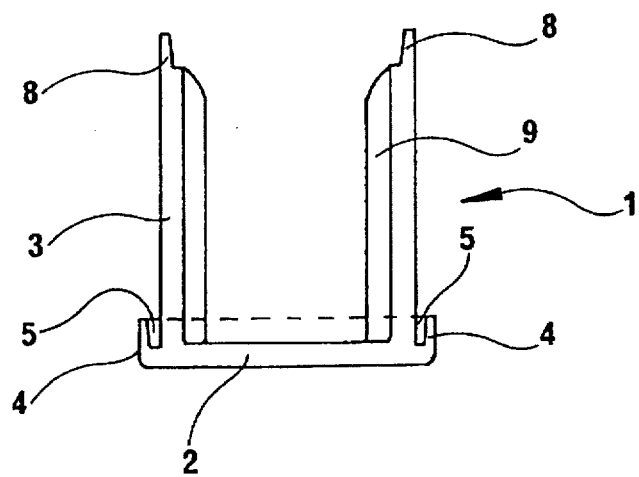
FIG. 3 is a cross-sectional view of the internal portion of the article according to FIG. 1

In the illustrated and described embodiment, a vial is produced for cosmetic products. The internal portion 1 of the article is first produced by molding a thermoplastic resin. The internal portion 1 is formed by a tubular element of circular cross section one of whose ends is closed by a bottom 2. The internal portion 1 has at its two ends assembly means.

Thus, the bottom 2 of the tubular element has a diameter larger than the diameter of the tubular portion 3 so as to provide a projection 4 along all of its periphery, a return portion of the projection 4 extending parallel to the tubular portion 3. Thus, between the tubular portion 3 and the projection 4 there is a recess 5. The tubular portion 3 of the internal portion 1 also has at its open end a projection 8 of the external surface of the tubular portion 3 all about its periphery.

The external surface of the tubular portion 3 and of the bottom 2 is then decorated or ornamented according to any desired decoration. In the present case, there is carried out a metallization treatment followed preferably by the application of UV varnish for protection. The internal surface 9 of the internal portion 1 remains bare of any decoration or ornamentation and constitutes the interior of the member.

The molding of the external transparent or translucent portion 10 is then carried out. This external portion 10 has the shape of a tubular element whose internal diameter corresponds to the external diameter of the internal portion 1 and which is open at its two ends. It has at one end a projection 11 on its internal surface extending outwardly. At the other end, its lateral wall 13 is bent inwardly of the tubular element 10 and thus forms a recess 14.

Figure 4:
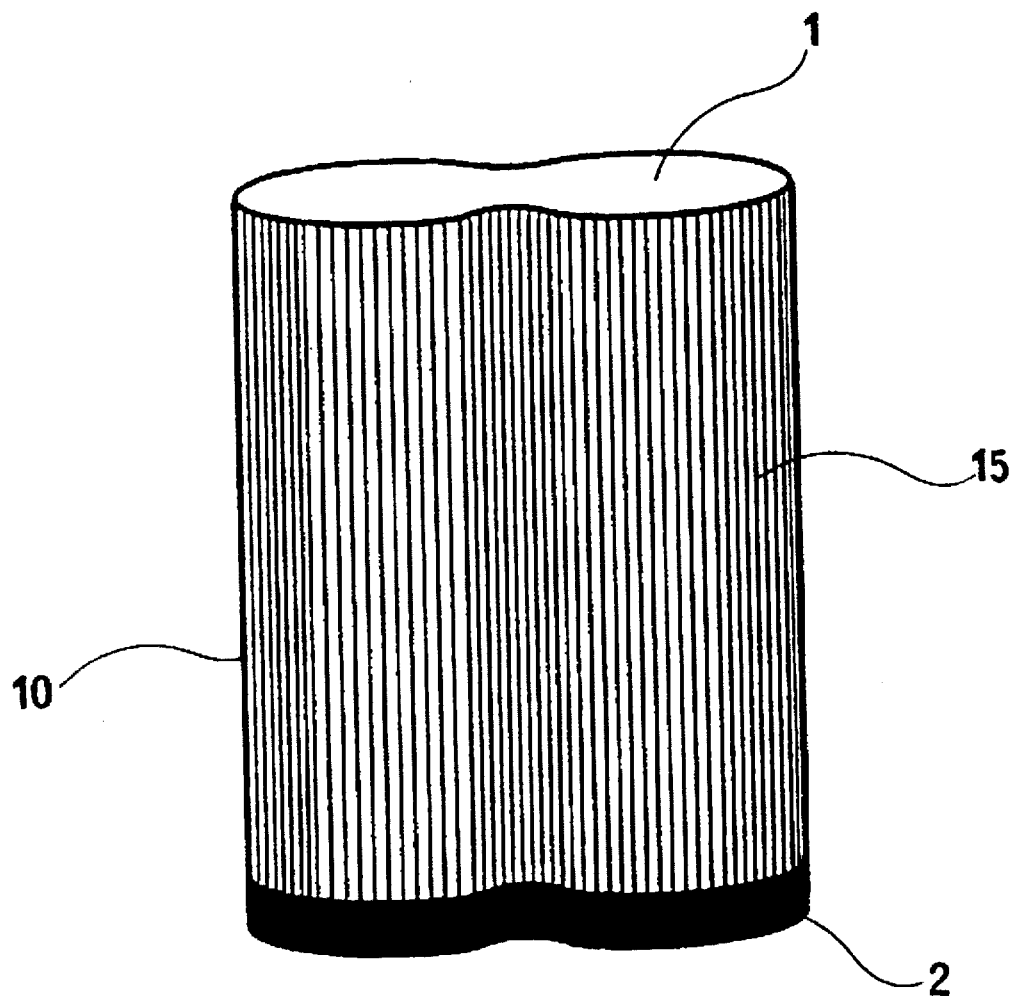
FIG. 4 is a side elevational view of the article according to FIG. 1.

The molding of the external portion can be effected such that the external surface of this latter can itself have supplemental decorative shapes such as grooves 15 as can be seen in FIG. 4.

The two internal and external portions 1 and 10 are assembled by insertion of the internal portion 1 into the external portion 10 such that the projection 11 on the external portion 10 is disposed in the recess 5 of the internal portion 1 and the projection 8 of the internal portion 1 is disposed in the recess 14 of the external portion 10. The internal and external portions are then welded by ultrasonic welding, which guarantees the integrity and sealing of the member thus formed.

There is thus easily and economically produced an article of synthetic resin through whose external translucent or semitranslucent portion can be seen more or less clearly a decoration which is thus protected from any external damage and which is consequently indelible. The process according to the invention permits simple production with a reduced number of steps.

Of course, any shape can be given to the article according to the invention and can be easily formed according to the present invention.

I claim:

1. A synthetic resin article comprising:

a translucent external portion;

an internal portion having an ornament on its external surface;

said external portion and said internal portion each comprising complementary assembly means and being assembled by contacting the complementary assembly means of the external portion to the assembly means of the internal portion, and by ultrasonically welding the internal and external portions together; said external and internal portions being in contact along their whole lengths, said internal portion being a tubular element having a tubular portion and a bottom, said bottom having a transverse cross section larger than that of the tubular portion and a bent-back edge disposed around the perimeter of said bottom creating a recess between said bent-back edge and said tubular portion; said tubular element having at its open end opposite said bottom a projection on its external surface, and the external portion being a tubular element of slightly larger cross section than that of the internal portion, one of the ends of said external portion having a projection from its internal surface disposed in said recess of the internal portion and having another end which has an edge bent back toward the interior of the external portion creating a recess in which is disposed said projection of the internal portion, and wherein the overall appearance of the article is determined by the external portion and by the external surface of the internal portion visible through the external portion.

2. A synthetic resin article according to claim 1, wherein said ornament is a metallization.

3. A synthetic resin article according to claim 1, wherein the internal portion is formed of a thermoplastic resin.

4. A synthetic resin article according to claim 3, wherein the thermoplastic resin is selected from the group consisting of polyolefin, polyamide, PVC, polyethylene terephthalate, and methylpentene resins.

5. A synthetic resin article according to claim 1, wherein the external portion is constituted of a synthetic resin.

6. A synthetic resin article according to claim 1, wherein the external portion is provided with decorative reliefs on its external surface.

* * * * *